UNITED STATES PATENT OFFICE.

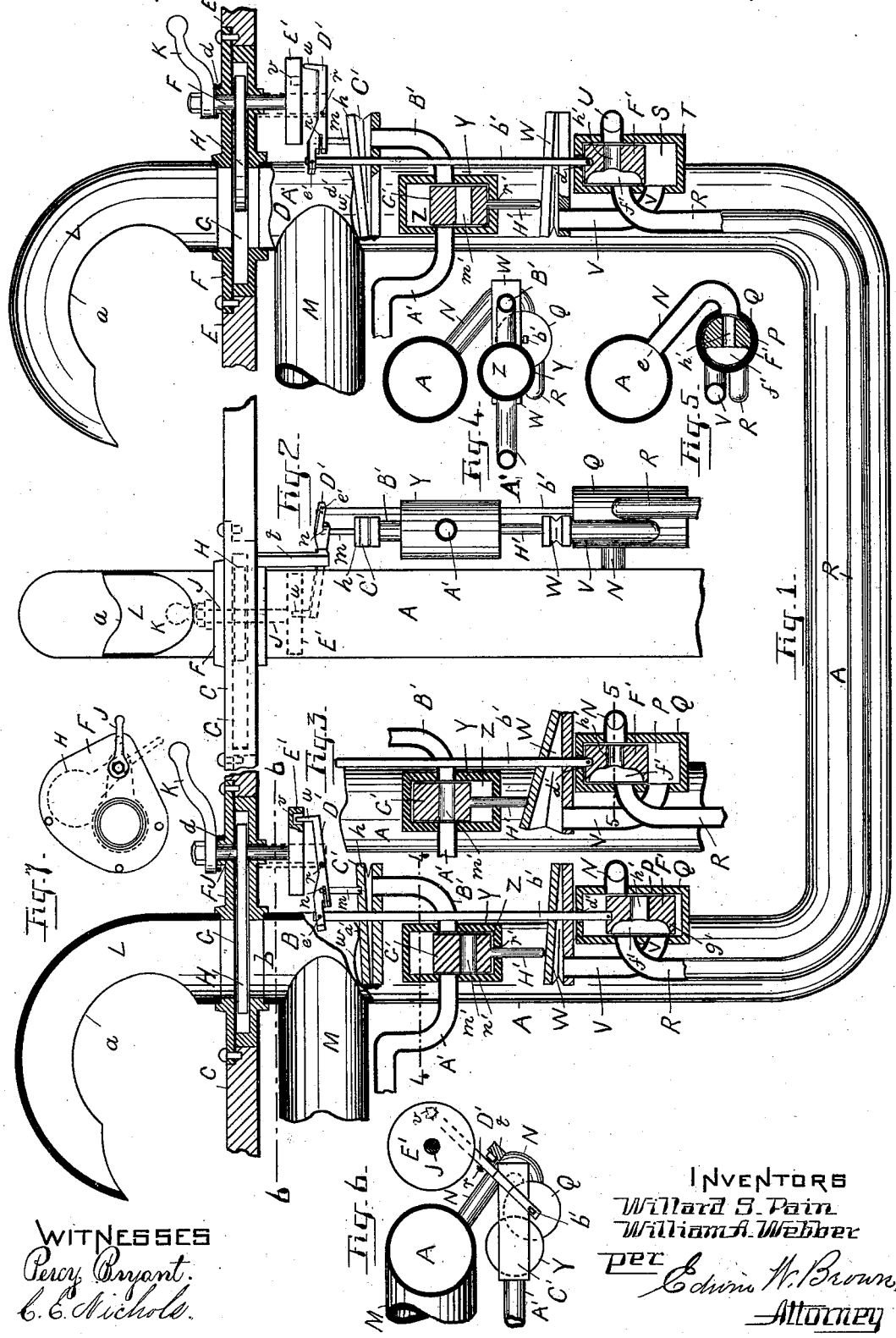

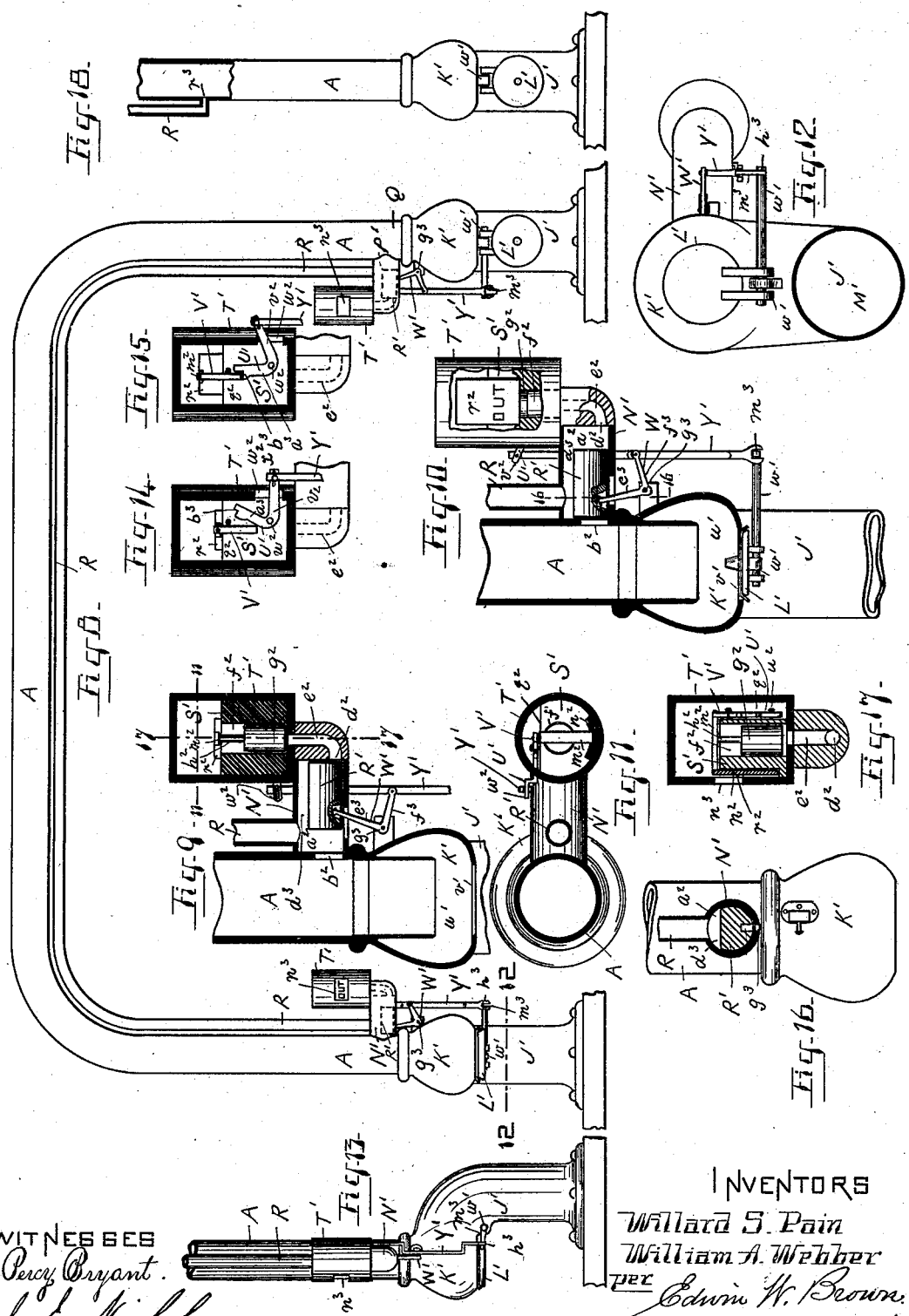

WILLARD S. PAIN, OF CAMBRIDGE, AND WILLIAM A. WEBBER, OF MEDFORD, MASSACHUSETTS.

PNEUMATIC CASH-CARRIER APPARATUS.

SPECIFICATION forming part of Letters Patent No. 376,159, dated January 10, 1888.

Application filed February 28, 1887. Serial No. 229,192. (No model.)

*To all whom it may concern:*

Be it known that we, WILLARD S. PAIN and WILLIAM A. WEBBER, respectively of Cambridge and Medford, in the county of Middlesex and State of Massachusetts, have invented certain new and useful Improvements in Pneumatic Cash-Carrier Apparatus, of which the following is a full, clear, and exact description.

This invention relates to improvements in pneumatic cash-carrier apparatus; and the object of the invention is to provide means for automatically notifying or indicating at the station from which the carrier, &c., is transmitted through the pneumatic tube when such carrier is discharged at the receiving or delivery end or station of the tube, or has arrived at some predetermined point near such receiving or delivery end, whereby from such notification or indication the operator can cease operation of the bellows or other air-motor by which the carrier is transmitted through the tube; and the invention consists in the combination, with a pneumatic tube for the transmission therethrough of a cash-carrier or other article, of an independent and separate tube or passage, preferably much smaller in area, having communication therewith at any predetermined point between the transmitting and delivery ends of the tube, and also in communication with an indicator or other device located at or near the transmitting end of the pneumatic tube and arranged to be operated from the passage of air therethrough, whereby, after the operator has placed in the pneumatic tube the cash-carrier, &c., and operated the bellows or other air-motor for its transmission therethrough, and such carrier has arrived at such predetermined point where such independent smaller tube or passage is in communication with the pneumatic tube, a portion of the air will travel back through such smaller tube or passage to and operate the indicator at the transmitting end in such manner that it will show or indicate to the operator that the carrier, &c., has arrived at and passed such predetermined point, so that he can then cease operation of the bellows or other air-motor, such predetermined point being also preferably located at such a distance from the delivery end that the momentum alone of the carrier, &c., will serve to carry it through the balance of the pneumatic tube and deliver it thereat, all substantially as hereinafter fully described; and the invention also consists in the combination, with the pneumatic tube for transmission of a carrier, &c., therethrough and the independent and separate tube or passage, of other means and parts for the proper operation thereof, all substantially as hereinafter fully described.

In the accompanying plate of drawings is illustrated the present invention, Figure 1 representing a pneumatic tube for the transmission therethrough of a cash-carrier or other article arranged to be operated by a bellows or other air-motor, and also representing the tube suitably arranged for the transmission of a cash-carrier therethrough from each end and its delivery therefrom from each end, and having attached thereto the present invention, the several parts being in central vertical cross-section, but not all in the same vertical plane. Fig. 2 is a side view of the left-hand part of Fig. 1; Fig. 3, a detail vertical section of the left-hand portion of Fig. 1, but showing some of the working parts in different positions; Fig. 4, a detail horizontal section on line 4 4, Fig. 1; Fig. 5, a detail horizontal section on line 5 5, Fig. 3; Fig. 6, a detail horizontal section on line 6 6, Fig. 1; and Fig. 7 is a detail plan view.

In the drawings, A represents a pneumatic tube of any suitable material and secured at one end, B, to a table, C, and extending therefrom, and secured by its other end, D, to the table E, the tables C E representing, respectively, the stations at the transmitting and delivery ends of the pneumatic tube, which is arranged and adapted to have the carrier or other article transmitted therethrough both ways.

F is a frame or casing attached to and inserted in an opening in the table, and having a central horizontal space or chamber, G, in which is adapted to move back and forth horizontally a plate or valve, H, swinging by its pivot J in bearings in the casing and having a handle, K, on the outside above the table for operation thereof, the tube A being secured direct to the under side of the frame, which has a passage through its two sides coincident with the tube A, and has secured to its upper side an extension, L, of the tube A, which extends upward in the form of a semicircle, as shown, this portion L of the tube being cut away or open on its under side, as shown at a.

The valve H moved in one direction covers or closes the opening b to the tube A below it, and moved back uncovers or opens the tube for communication therewith, and is held open by the spiral spring d, encircling the pivot J of the valve.

M is a pipe, which opens into the tube A below the valve H, and communicating with any suitable bellows or other air-motor for operation of the apparatus.

The end D of the tube has a valve, H, and other parts in connection therewith, as at the end B of the tube A, the several parts being designated by like letters.

With a carrier or other article placed in the tube A at b, the carrier, &c., by its gravity falls down the pneumatic tube below the place where the pipe M communicates therewith, and then, closing the valve H and operating the bellows or other air-motor, the carrier, &c., by the pressure of air in the tube, will be transmitted through the tube toward and out at the other end, D, being there delivered onto the table. If the person thereat is desirous of returning the carrier, &c., to the station from whence it came, he performs the same operation with the bellows and valve, &c., at such end for its return. The valves H are always open, being so held by their respective springs, the one at the transmitting end being only closed when a carrier is being transmitted through the tube from such end. Such an arrangement and operation is common and well known in pneumatic cash-carrier apparatus, and needs no more particular description herein.

N is a small pipe or tube of much smaller area in cross-section than and communicating with the pneumatic tube A at e, and from thence bending round and entering and communicating with a chamber, P, in a cylinder, Q, located at the side of the tube A. On the other side of this cylinder Q is a pipe, R, of the same diameter as the pipe N, communicating with the chamber P, which extends along with the pneumatic tube, as shown, and at its other end, f', enters and communicates with a chamber, S, of a cylinder, T, and from this cylinder T on its opposite side extends a pipe, U, entering and communicating with the pneumatic tube A.

V is a pipe connected by one end to the cylinder Q, communicating with its chamber P, and thence extending upward and attached to a small bellows or expanding and collapsible chamber, W, having communication therewith.

Y is another vertical cylinder having a chamber, Z, with which, on one side, communicates a pipe, A', which extends to and communicates with the operating-bellows or other air-motor in any suitable manner, and in the opposite side of this cylinder Y is another pipe, B', having communication with its chamber Z, and by its other end attached to and communicating with another small bellows or expanding and collapsible chamber, C'. The upper or movable board, h, of this bellows C' has a rod, m, pivoted thereto by one end, which, by its other end, is pivoted at n to a lever, D', pivoted at r to a suitable support, t, and having an upwardly-extending or right-angular portion or arm, u, arranged to bear against the under side of a horizontal disk or plate, E', rigidly attached to the spindle or pivot J below the frame F of the valve H, and when the valve is swung round into position for it to close the opening b of the tube A the end or arm u will engage with an aperture or socket, v, in the under side of the disk or plate E' and hold the valve in its closed position, such engagement being held by a spring, w, attached to the bellows C', and bearing down by its free end a' on the top of the movable board h.

Within the chamber P of the cylinder Q is a plug or valve, F', which is of a diameter to fill the chamber and yet have free movement up and down therein, its length being such as to allow for such movements. Connected to the top of this plug or valve is a rod, b', which passes freely through an opening, d', in the top of the cylinder Q, and at its upper end is pivoted, at e', to an extension of the lever D'.

The valve F' on one side has a depression or chamber, f', which is of such a length and width that when the valve is in the position shown at g' in Fig. 1 it will extend over the openings to the pipes V and R to make a passage and form communication between the two pipes. Extending horizontally through this valve F' and back from the chamber f' is a passage, h', which passage, when the valve F' is in the position shown in Fig. 3, will be in communication with the pipe N, and when in such position its chamber f' will only have communication with the pipe R, as shown in Fig. 3, and when moved down into position to make communication between the pipes V R it will close communication with the pipe N. (Shown in Fig. 1 at g'.)

In the cylinder Y is a plug or valve, G', having a transverse passage, m', through it, the valve being adapted to fit the chamber Z of the cylinder and yet to freely move up and down therein, and when up to have its passage m' in line and in communication with the pipes A' and B', as shown in Fig. 3, and when down to break or close such communication, as shown in Fig. 1 at n'. On the lower end of this valve G' is an arm, H', projecting downward and passing through an opening, r', in the bottom of the cylinder for its lower end to rest upon the top and moving board of the bellows W, so that if this bellows is opened it will raise the valve G', as shown in Fig. 3.

When the valve G' is closed and the lever D' engaged with its disk or plate E', it will be in its lowermost position, as shown at n' in Fig. 1, and when the valve is open and the lever disengaged the valve will be in the position shown in Figs. 3 and 1, at the end D of the tube A.

The operation is as follows: A carrier, &c., being placed in the pneumatic tube A at $b$ on the left of Fig. 1, its valve H is closed, which swings the disk or plate E' into position for the lever-arm $u$ to engage with its socket $v$, and thus hold the valve closed, the lever being held to such engagement by the spring $w$ bearing down upon the movable board $h$ of the bellows C'. By moving the lever into such engagement the valve F' is moved down, by which the pipe N is closed to communication with the pipe R, but the two pipes V and R opened to communication with each other, as shown at $g'$ in Fig. 1. The several valves at the other or right end, D, of the tube are all in the position shown at the right, the valve H there being open and in its normal position. The bellows or other air-motor is now operated, which sends the carrier along the tube A toward the end D, and when the carrier arrives at and passes the point in the tube at such end where the pipe U is in communication therewith a portion of the air enters said pipe U, passing through the valve F' into the pipe R, and returning in said pipe passes into the chamber $f'$ of the valve F', through it into the pipe V, opening the bellows W, which in turn raises the valve G' in the cylinder Y and makes communication between the pipe A' from the operating-bellows and the pipe B', opening into the bellows C', which, filling with air, raises its movable board $h$ and operates the lever D' to disengage its arm $u$ from the disk or plate E' of the valve H, which is then opened by the action of its spring $d$. At the same time, by the rod $b'$, the valve F' is raised, breaking communication between the two pipes V R, so that the air will not pass back to the pipe R.

In Fig. 3 is represented the position of the valves F' and G' when the air returns in the pipe R from the delivery end and operates the valves, as described. Thus as soon as the carrier, &c., reaches and passes the point where the pipe U communicates with the tube A at the delivery end the valve H at the transmitting end is opened, as described, which not only indicates to the operator at the transmitting end such fact, when he can cease operation of the bellows or other air-motor and leave the station to attend to other duties, but also places the valve H in its normal and open position for a carrier, &c., transmitted from the other end of the tube to be delivered at such end.

The several cylinders and bellows, &c., are all supported in position in relation to each other for the proper operation of the several valves, &c., although such supports are not shown in the drawings; also, the cylinders and their valves, bellows, and the pipes and mode of connection and arrangement are precisely the same at each end of the tube, and like letters are used at each end for the same parts, except that the pipe N, cylinder Q, and chamber P of the end B are lettered, respectively, U T S at the end D, so that the tube can be used to transmit a carrier, &c., each way and have its position therein indicated in the same manner at each end; also, the pipes R, U, and N are practically one pipe, having intermediate cylinder-chambers P and S.

Any suitable valve, H, can be used, and it can be arranged in any suitable manner for the engagement of the lever therewith to lock it when closed.

In lieu of operating the valve to indicate the arrival of the carrier, &c., at its destination, as described, another form of indicator can be used—as, for instance, such as shown in Figs. 8 to 18, inclusive, Fig. 8 representing in side view a pneumatic tube, A, extending between two stations, and each end arranged and adapted to transmit and deliver a carrier, &c., through the tube. Fig. 9 represents in vertical central section the left-hand end of the tube, showing the operating parts of the invention. Fig. 10 is a similar view to Fig. 9, but showing the operating parts in different positions. Fig. 11 is a cross-section on line 11 11, Fig. 9. Fig. 12 is a cross section on line 12 12, Fig. 8, looking up. Fig. 13 is a side view of the left-hand end of Fig. 8. Figs. 14 and 15 are detail vertical cross-sections showing the parts in side view in two different positions. Fig. 16 is a detail vertical section on line 16 16, Fig. 10; Fig. 17, a detail vertical section on line 17 17, Fig. 9; and Fig. 18 is a detail view, to be hereinafter referred to.

In these views the pneumatic tube A at each end is attached to a receiving or delivery standard, J', which standards are secured to their respective tables, and each has a head, K', in which is secured the end of the tube A, and communicating with its chamber $u'$, which chamber has an opening, $v'$, arranged to be opened and closed by a valve, L', pivoted at $w'$ to the standard, and the chamber $u'$, having communication through the standard - chamber M', which in turn, by suitable pipe-connections, (not shown,) has communication with an operating-bellows or other air-motor, all of which is well known and needing no particular description herein, except so far as the present invention is concerned.

N' is a horizontal cylinder secured to the tube A and having communication by its chamber $a^2$, through an opening, $b^2$, with the tube A. From this cylinder N' the small tube R, having communication with the cylinder-chamber $a^2$, extends along and with the tube A toward the other end, where it is connected to a cylinder, P', secured at the right-hand end, Q, of the tube, and having communication with its chamber $a^2$, which cylinder-chamber has communication with the tube A. In each of these cylinder-chambers $a^2$ is a plug or valve, R', adapted to fit its chamber and to slide freely back and forth therein, it being of suitable length therefor. At the other end of this chamber $a^2$ is an opening, $d^2$, which communicates, by a passage, $e^2$, with a chamber, $f^2$, in a block, S', closely fitting a cylinder or casing, T'. In this chamber $f^2$ is a piston, $g^2$, adapted to move up and down therein, and when in its normal position to rest upon the bottom of the cylinder. From the top of this piston $g^2$, at the center, rises a stem, $h^2$, having attached to it a cross head or bar, $m^2$, which extends across the top of the block S'. The block S' is cut away vertically on one side, as at $n^2$, in which is disposed a flat strip or piece, $r^2$, attached rigidly to one end of the crosshead $m^2$. The block S' is also cut away at its opposite side at $t^2$, and pivoted thereto at $u^2$ is a V-shaped bar, U', or lever, one, $v^2$, of its arms extending through an opening, $w^2$, in the casing and projecting therefrom, its other arm, $a^3$, extending upward and having a notch, $b^3$, cut therein. Pivoted to the opposite end of the cross-head $m^2$ from the strip $r^2$ is an arm or pawl, V', arranged to hang down therefrom and freely swing on such pivot.

If the piston $g^2$ is raised in its chamber $f^2$ and the bar U' swung up and there held, the pawl V' will swing into the notch $b^3$ of the bar, and so long as the bar is so held the piston will remain up; but when the bar is moved back its notch $b^3$ moves away from its position under the swinging pawl V', which allows the piston to fall by its own weight to its normal position.

The valve R' in the cylinder-chamber $a^2$ is cut away on its upper side to leave a space, $d^3$, in the chamber $a^2$, and it is arranged to move back and forth in said chamber to alternately close and open the passages $b^2$ and $d^2$, forming, respectively, communication between its chamber $a^2$ and the tube A and chamber $f^2$. Connected to this valve R' by one, $e^3$, of its arms $e^3$ $f^3$ is a bell-crank, W', pivoted at $g^3$ to the standard, its arm $e^3$ passing through a slot in the under side of the cylinder, and its other arm, $f^3$, being connected to a rod, Y', which, by its lower end, is connected, by a pivot, $h^3$, to a crank-arm, $m^3$, of the pivot or shaft $w'$ of the valve L', arranged to close the opening $v'$ to the head K'. The arm $v^2$ of the bar U' is connected, by a pivot, $x^2$, to the upper end of the rod Y' for operation thereof. As the valve L' is raised to close its opening $v'$ through the rod Y' and bell-crank connection, the valve in the cylinder N' will be moved to the left, and thus close the passage $b^2$ to the tube A and correspondingly open the passage $d^2$, leading to the block-chamber $f^2$, and when the valve L' is lowered to open its passage $v'$ the valve R' will be moved in the reverse direction, opening the passage $b^2$ and closing the passage $d^2$; also, as the valve L' is raised it swings the bar U' into position for the pawl V' of the piston $g^2$ to engage with its notch, provided it should be then raised by any means. In the side of the casing T' opposite to lever U' is an opening, $n^3$, in front of the strip $r^2$, and on this strip is printed the word "Out," which, when the piston is raised, will be opposite to such opening $n^3$, where it can be seen from the outside; but when the piston is down it will be below such opening and cannot then be seen.

The operation is as follows: The carrier, &c., being inserted in the tube at the head K', the valve L' is then closed by hand and held closed, which, by its connections described, moves the valve R' to close the passage $b^2$ to the tube A, and opens the passage $d^2$ to the piston-chamber $f^2$, and also moves the bar U' into proper position for the pawl V' of the piston $g^2$ to engage with its notch $b^3$, should it be raised with the parts in these positions, all as shown in Fig. 15. The bellows or other air-motor is then operated, which sends the carrier, &c., through the tube to deliver it at the other end, Q, through its head K', as usual. The valve L' at this end is open, and its valve R' consequently in the reverse position of the valve R' at the transmitting end B—for instance, in position for it to close the passage $d^2$, leading to the piston-chamber $f^2$, and to open the passage $b^2$, communicating with the tube A. Now, when the carrier, &c., arrives at and passes the passage $b^2$, opening to the chamber $a^2$ at the end Q of the tube A, air immediately passes into such chamber, thence out of it into the small tube R, and back through this tube R through the passage $b^2$ into the chamber $a^2$ of the cylinder N' at the transmitting end or station; thence through the passage $d^2$ into the piston chamber $f^2$, and then raising the piston $g^2$, so that its pawl V' catches in the notch $b^3$ of the bar U', which is held in proper position therefor by the valve L' being closed. As the piston rises, the strip $r^2$ rises with it, showing in front of the opening $n^3$ the word "Out," indicating to the sender that the carrier has passed the point of connection between the small tube and the main tube at or near the delivery end, and that, therefore, it is properly delivered at the other end, whereby he can cease operation of the bellows or other air-motor and release the valve L', so that it will open and bring the other valve, R', and arm U', dropping the piston $g^2$, into their normal positions. In this mode the apparatus only indicates to the sender that the carrier, &c., has arrived at its destination, while in the other arrangement it not only indicates such, but also releases the valve H, so it can open by its spring.

In practical operation the valves H L' are always open, except when a carrier is to be transmitted, when the valve L' at the transmitting end of the tube is closed until the carrier is delivered. An indicator is arranged at each end of the tube, so that it will serve for each end, as, there being only one tube, it is used to transmit a carrier both ways back and forth.

Provided the tube is used to transmit only in one direction and another tube used to return the carrier, then at the delivery end of the tube the small tube R would communicate direct with the main tube A, as shown at $r^3$, Fig. 18, as there would be no need of another valve arrangement at the delivery end when for such single use.

The small tube R can be arranged to communicate with the main tube A at any distance back from the delivery end of the tube, as desired, and can be arranged at such a distance from such end that after the operator has ceased operation of the bellows or other air-motor, because he knows by the indicator that the carrier has arrived at the determined place, the carrier will by its momentum be moved the rest of the distance for its discharge at the end of the tube, which is of some advantage, since when so delivered, having been relieved of more or less of the power to propel it, it will be discharged with somewhat less force, and thus prevent its being injured, as is apt to be the case when the full force of the propelling-power is exerted until the carrier is discharged from or leaves the tube.

The pneumatic tube can be arranged to communicate with the several stations by either passing downward, as shown in Fig. 1, or upward, as shown in Fig. 8, some of the parts being changed to suit such directions. It is preferable, however, in the downward tube to arrange the ends as shown in Fig. 1, and in the upward tube as shown in Fig. 8.

Although the tube R in Fig. 8 is shown as communicating with the pneumatic tube near the standard, it is obvious it can be at any desired distance back therefrom and the indicator placed in any convenient position for observation, it being only necessary to attach the tube R and lengthen the passage $e^2$ accordingly; also, the same for the parts shown in Fig. 1; also, in lieu of the valve F' being connected to the lever D', it can be arranged to operate the piston $g^2$, (shown in Fig. 9 and others,) the valve acting upon the bar U' in such figure in a similar manner to the valve L'.

Figs. 9, 10, 11, 12, 14, 15, 16, and 17 are enlarged.

Fig. 7 is a plan view of the carrier or frame F detached, showing in dotted lines the valve H in its closed and open positions, and the passage through the casing forming communication between the tube A and its extension L.

In lieu of the indicator particularly shown and described, it can be of any form and operated in any suitable manner by the air through the supplementary tube, and in lieu of having the indicator show it can be made to sound—as, for instance, by a bell or gong or wire, &c., or any suitable device which can vibrate and produce a sound, and operated in any suitable manner; or, if desired, the two can be used together—that is, an indicator arranged for sight and auricular observations—or either one can be used alone, this invention not being limited to any particular form of indicator or any particular manner of operating it, except by and from the passage of air through the supplementary tube or passage; also, in lieu of the air passing from the pneumatic tube to the independent or supplementary tube for the operation of the indicator, it can be operated by air passing through such independent tube or passage from any suitable bellows or other collapsible and expansible chamber operated from the passage of the carrier, &c., through said pneumatic tube by the point or place it is desired that the indicator shall show the carrier, &c., has passed.

Having thus described our invention, what we claim is—

1. The combination, with a pneumatic tube for transmissson therethrough of a carrier, &c., of an independent tube or passage having communication with an indicator operated by air passing through such independent tube or passage from any suitable bellows or other collapsible and expansive chamber to indicate whether the carrier, &c., has passed by or beyond a predetermined point in said pneumatic tube, for the purpose specified.

2. The combination, with a pneumatic tube for transmission therethrough of a carrier, &c., of an independent tube or passage having communication therewith at any desired point and an indicator operated by air passing through such independent tube or passage to indicate whether the carrier, &c., has passed by or beyond said point of communication of the independent tube or passage with the main pneumatic tube.

3. The combination, with a pneumatic tube for transmission therethrough of a carrier, &c., and an independent tube or passage having communication therewith at any desired point, of mechanism operated by and from air passing through said independent tube or passage and arranged to engage with the valve adapted to close and open the pneumatic tube where the carrier, &c., is inserted therein, for the purpose specified.

4. The combination, with a pneumatic tube for transmission therethrough of a carrier, &c., and an independent tube or passage having communication therewith at any desired point, of a valve, F', to said independent tube or passage, connected to a lever or arm, D', arranged to engage with the valve adapted to close and open the pneumatic tube where the carrier, &c., is inserted therein, for the purpose specified.

5. The combination, with a pneumatic tube for transmission therethrough of a carrier, &c., and an independent tube or passage having communication therewith at any desired point, of a valve, F', to said independent tube or passage, connected to a lever or arm, D', arranged to engage with the valve adapted to close and open the pneumatic tube where the carrier, &c., is inserted therein, and means for acting on said lever D', operated by air from the operating-bellows or other air-motor.

6. The combination, with a pneumatic tube for transmission therethrough of a carrier, &c., and an independent tube or passage having communication therewith at any desired point, of a valve, F', to said independent tube or passage, connected to a lever or arm, D', arranged to engage with the valve adapted to close and open the pneumatic tube where the carrier, &c., is inserted therein, and a bellows or expanding and collapsible chamber having communication with said valve F' and arranged to operate a valve in a tube or pipe leading from the main operating-bellows or other air-motor to a bellows or expanding and collapsible chamber connected to the lever or arm D', for the purpose specified.

7. The combination, with a pneumatic tube for transmission therethrough of a carrier, &c., and an independent tube or passage having communication therewith at any desired point, of a valve, F', to said independent tube or passage, connected to a lever or arm, D', arranged to engage with the valve adapted to close and open the pneumatic tube where the carrier, &c., is inserted therein, said valve F' having air-communication with a bellows or expanding and collapsible chamber, W, operating a valve between the operating-bellows or other air-motor and a bellows or expanding and collapsible chamber connected to the lever D', for the purpose specified.

8. The combination, with a pneumatic tube for transmission therethrough of a carrier, &c., and an independent tube or passage having communication therewith at any desired point, of a valve, F', to said independent tube or passage, connected to a lever or arm, D', arranged to engage with a disk or plate, E', of the valve adapted to close and open the pneumatic tube where the carrier, &c., is inserted therein, said valve F' having air-communication with a bellows or expanding and collapsible chamber, W, operating a valve between the operating-bellows or other air-motor and a bellows or expanding and collapsible chamber connected to the lever D', for the purpose specified.

9. The combination, with a pneumatic tube for transmission therethrough of a carrier, &c., and an independent tube or passage having communication therewith at any desired point, of a valve to said independent tube or passage, connected to the valve adapted to close and open the pneumatic tube where the carrier, &c., is inserted therein and arranged to open and close air-communication between said independent tube or passage, and an indicator for indicating whether the carrier has passed by the point of communication of the independent tube or passage with the pneumatic tube.

In testimony whereof we have hereunto set our hands in the presence of two subscribing witnesses.

WILLARD S. PAIN.
WILLIAM A. WEBBER.

Witnesses:
EDWIN W. BROWN,
PERCY BRYANT.